Jan. 14, 1969   W. G. KOERNER   3,421,714
RE-ENTRY VEHICLE FOR SMALL PACKAGES
Filed April 4, 1967

INVENTOR.
WARREN G. KOERNER
BY

ATTORNEY.

United States Patent Office 3,421,714
Patented Jan. 14, 1969

3,421,714
RE-ENTRY VEHICLE FOR SMALL PACKAGES
Warren G. Koerner, Manhattan Beach, Calif., assignor to the United States of America as represented by the United States Atomic Energy Commission
Filed Apr. 4, 1967, Ser. No. 628,791
U.S. Cl. 244—1
Int. Cl. B64c 31/00
2 Claims

ABSTRACT OF THE DISCLOSURE

A passive vehicle for conveying small payload packages or capsules from earth satellites and other space vehicles back through the atmosphere, landing them intact on the earth. The payload package is carried in a central housing with fins attached thereto. The fins serve as aerodynamic drag surfaces, reducing the velocity of the vehicle as it falls through the atmosphere; radiate heat from the vehicle; and cushion the package during impact with the ground.

BACKGROUND OF INVENTION

The invention described herein was made in the course of, or under, Contract No. AT(04-3)-517 with the United States Atomic Energy Commission.

This invention relates generally to space vehicles, and more particularly to a passive device for obtaining the intact re-entry and landing of small packages or capsules.

Earth satellites and other space vehicles of the prior art carry many types of small packages whose safe re-entry and intact recovery are desirable from the standpoint of economy and safety. Among these are data capsules, instrumentation packages, and small nuclear reactor or radioisotope power plants. These small capsule packages generally have high densities and, consequently, fall toward the earth at such high velocities that they are likely to be destroyed either by aerodynamic heating during re-entry into the atmosphere or by impact with the ground during landing.

Where the package is a small nuclear power plant, intact re-entry and landing are particularly important and difficult. A rupture of this type of package at any time could result in the scattering of radioisotopes over large areas, resulting in exposure of persons, animals, vegetation, and other forms of life to dangerous amounts of radioactivity. The re-entry velocity of power plant packages may be unusually high, since in addition to being very dense, these packages generally have high ballistic coefficients, i.e., their shape may be one not subject to substantial aerodynamic drag. Furthermore, the nuclear power plant may continue to operate during its return to the earth, and since such power plants operate at high temperatures, the additional heating imposed during re-entry can easily cause the package to melt and disintegrate, with consequent dispersal of the radioactive materials.

In the past, the general approach to re-entry and landing has been the use of heat shields made of an ablative material and the utilization of certain blunt-nosed configurations. There devices, however, are more suited to use with larger, bulkier payloads than with smaller, more dense packages of the type concerned herein.

SUMMARY OF INVENTION

The present invention presents a simple and efficient technique for reducing the velocity and heating of small dense re-entry packages, as well as providing some cushioning for the package upon impact with the ground. The basic approach is to provide the package with aerodynamic drag surfaces which slow its fall toward the earth and at the same time cause it to rotate. The rotation distributes aerodynamic heating and radiative cooling effects over the entire package, and this distribution, together with the reduction in velocity, keeps the package at a safe temperature during re-entry. The reduction in velocity also materially reduces the violence of the impact of the package with the earth. This impact is further reduced by causing the package to land on the drag surfaces and be cushioned by their deformation, rather than striking the earth directly. Although the present invention was designed primarily for use with small nuclear power plant packages, especially radioisotope heat sources, it is equally applicable with other types of small re-entry packages.

Accordingly, it is one object of this invention to convey small packages from earth satellites and other space vehicles back to the earth, so they can be recovered intact.

It is another object of this invention to protect small payload packages from destruction by aerodynamic heating during re-entry into and passage through the earth's atmosphere.

It is a further object of this invention to prevent the destruction of small re-entry packages by their final impact with the ground.

This invention, together with further objects and advantages thereof, will be better understood by reference to the following specification and drawing.

DESCRIPTION OF PREFERRED EMBODIMENT

Figure 1:
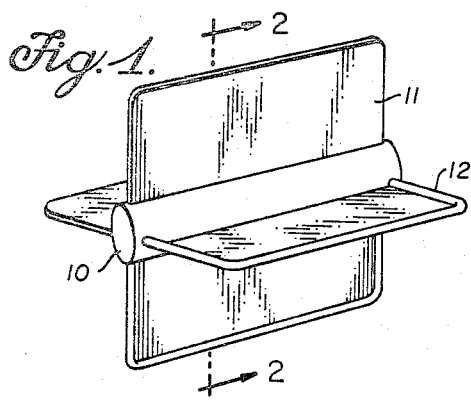
FIGURE 1 is a perspective view of an embodiment of the re-entry vehicle having four fins or drag surfaces, wherein the means for rotation consists of a circular bead disposed along the outer peripheral edges of the fins.

Referring now to the figures, the re-entry vehicle comprises a container 10, fins 11, and passive means 12, for causing the vehicle to rotate as it descends through the atmosphere.

The container is an elongated hollow body suitable for housing the payload package. In the figures, the container is depicted as a cylinder, but it may be any convenient shape which is symmetrical about its longitudinal axis. In some instances, the payload package itself may serve as the container. The container is preferably constructed of a material having at least moderate thermal conductivity, i.e., copper or combinations of copper or other materials having high thermal conductivity properties with materials of lower thermal conductivity properties, such as stainless steel, molybdenum, tungstun.

The fins 11, comprise three or more surface members attached by welding, brazing, or the like to the sides of the container, i.e., the surfaces parallel its longitudinal axis. As depicted in the drawing, the fins 11, are equally spaced about the circumference of the container 10, and extend radially outward therefrom. The longitudinal length of the fins 11, is approximately equal to the length of the container 10, while their radial length is adjusted to provide the desired aerodynamic drag, along with sufficient surface area to radiate heat generated by friction with the atmosphere and also to provide sufficient material to deform upon impact with the ground or other immovable object and reduce the forces from such deceleration to a safe level.

Figure 3:
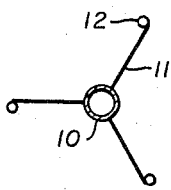
FIGURE 3 is a transverse cross-section of an embodiment of the re-entry vehicle having three fins or drag surfaces, wherein the means for rotation consists of a circular bead disposed along the outer peripheral edges of the fins.
Figure 2:
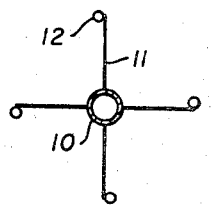
FIGURE 2 is a transverse cross-section of the embodiment depicted in FIGURE 1, wherein four fins or drag surfaces are used.
Figure 4:
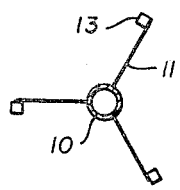
FIGURE 4 is a transverse cross-section of an embodiment of the re-entry vehicle having three fins or drag surfaces, wherein the means for rotation consists of a square or rectangular bead disposed along the outer peripheral edges of the fins.
Figure 5:
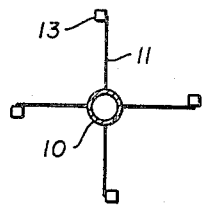
FIGURE 5 is a transverse cross-section of an embodiment of the re-entry vehicle having four fins or drag surfaces, wherein the means for rotation consists of a square or rectangular bead disposed along the outer peripheral edges of the fins.
Figure 6:
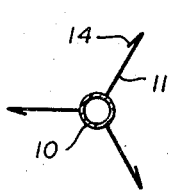
FIGURE 6 is a transverse cross-section of an embodiment of the re-entry vehicle having three fins or drag surfaces, wherein the means for rotation consists of bending each fin such that its outer edge forms an acute angle with the remainder thereof.
Figure 7:
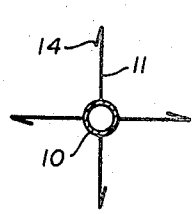
FIGURE 7 is a transverse cross-section of an embodiment of the re-entry vehicle having four fins or drag surfaces, wherein the means for rotation consists of bending each fin such that its outer edge forms an acute angle with the remainder thereof.
Figure 8:
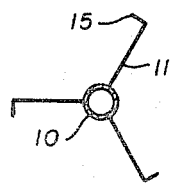
FIGURE 8 is a transverse cross-section of an embodiment of the re-entry vehicle having three fins or drag surfaces, wherein the means for rotation consists of bending each fin such that its outer edge forms a right angle with the remainder thereof.
Figure 9:
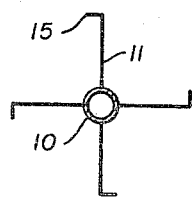
FIGURE 9 is a transverse cross-section of an embodiment of the re-entry vehicle having four fins or drag surfaces, wherein the means for rotation consists of bending each fin such that its outer edge forms a right angle with the remainder thereof.
Figure 10:
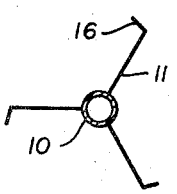
FIGURE 10 is a transverse cross-section of an embodiment of the re-entry vehicle having three fins or drag surfaces, wherein the means for rotation consists of bending each fin such that its outer edge forms an obtuse angle with the remainder thereof.
Figure 11:
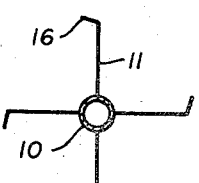
FIGURE 11 is a transverse cross-section of an embodiment of the re-entry vehicle having four fins or drag surfaces, wherein the means for rotation consists of bending each fin such that its outer edge forms an obtuse angle with the remainder thereof.
Figure 12:
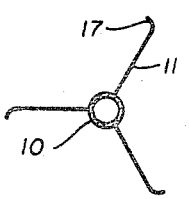
FIGURE 12 is a transverse cross-section of an embodiment of the re-entry vehicle having three fins or drag surfaces, wherein the means for rotation consists of bending the outer edge of each fin into a curve.
Figure 13:
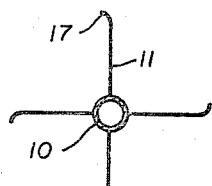
FIGURE 13 is a transverse cross-section of an embodiment of the re-entry vehicle having four fins or drag surfaces, wherein the means for rotation consists of bending the outer edge of each fin into a curve.

Rotation of the re-entry vehicle as it falls through the atmosphere is induced by an aerodynamic torque asymmetry about the longitudinal axis of container 10. Several possible configurations for achieving this are depicted in the drawing. In FIGURES 1, 2, and 3, a circular bead 12, is shown disposed along the ends and outer edge of a corresponding side of each of the fins 11. FIGURES 4 and 5 show a bead 13, disposed in a manner similar to bead 11 of FIGURES 1, 2, and 3, but having a square or rectangular cross-section. The vehicle will rotate even though the bead is placed only along the outer edge of each fin 11. However, it has been found that better rotation is achieved by extending the bead along the ends of the fins as well. Other means for inducing rotation include bending the outer edge of each fin 11 to define an acute angle projection 14, as in FIGURES 6 and 7. A right angle projection 15, illustrated in FIGURES 8 and 9, will also produce the desired rotation, as will an obtuse angle projection 16, shown in FIGURES 10 and 11, and curved projection 17, depicted in FIGURES 12 and 13.

When the re-entry vehicle of this invention is placed in operation, i.e., as it falls through the atmosphere, it has been found that because of the configuration of fins 11, the vehicle assumes a broadside position, with its longitudinal axis perpendicular to the direction of travel. It has also been found that the vehicle tends toward this attitude regardless of the angle at which it is released or any spin imparted initially. When the vehicle travels in this broadside position, the aerodynamic torque asymmetry created by the beads 12 or 13, or other rotation means, such as projection 14, 15, 16, or 17, causes the vehicle to rotate or spin about its longitudinal axis. This spinning motion produces a gyroscopic effect which further stabilizes the vehicle in the broadside position and discourages end-over-end tumbling.

As the re-entry vehicle travels in its broadside position through the atmosphere, fins 11, act as aerodynamic drag surfaces, reducing the velocity of the vehicle as it descends. It can be seen that when the vehicle is in the broadside position, the maximum effective drag area is presented, so that a maximum decelerating force is applied to the re-entry vehicle.

The rotation of the finned vehicle as it falls toward the earth greatly aleviates the heating problems which commonly plague objects re-entering into and descending through the atmosphere. Aerodynamic drag imposes severe heating on the forward or leading faces of such objects, while some cooling occurs on their rear or trailing surfaces by the radiation of heat therefrom. Since the heating effect is aggravated whenever aerodynamic drag is increased, it might seem that a re-entry vehicle equipped with fins acting as drag surfaces would be especially susceptible to damage from overheating. This would in fact be the case with the instant invention but for the rotation of the finned vehicle about the longitudinal axis. The forwardly projecting fins do tend to be heated to high temperatures, but when the fins rotate to a position rearward of the casing, no heating occurs on them, and the heat stored in them is removed by thermal radiation. Thus, it is preferable to treat the surface of the fins 11, to achieve as high thermal emissivity as possible. Heat internally generated in the container 10, is likewise radiated through conduction to fins 11, and thermal radiation therefrom. Thus, overheating of any one surface either by re-entry effects or by internal heating is averted, and the entire vehicle may be maintained at a safe temperature.

The arrangement of the fins is such that the vehicle will land on them as it falls broadside to the earth. Upon impact, the fins tend to be deformed or crushed, thereby providing some cushioning for the payload package carried in the casing.

Figure 14A:
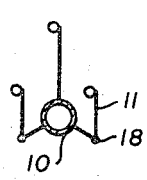
FIGURE 14a is a transverse cross-section of an embodiment of the re-entry vehicle having collapsible fins or drag surfaces.
Figure 14B:
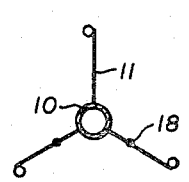
FIGURE 14b is a transverse cross-section of the embodiment shown in FIGURE 14a, with the fins in the extended position.

The configurations depicted in the figures are but a few of the possible embodiments of the invention described herein. The number of fins need not be limited to four, as long as rotation is induced and heat radiated therefrom. In some embodiments, it might be desirable to utilize folding or collapsable fins which prior to re-entry would be wrapped closely around the payload package, then open and lock into place as re-entry is begun. Such an embodiment is illustrated in FIGURES 14a and 14b, wherein fins 11 are provided with hinge means 18, proximate their base, such that when being carried by another vehicle, fins 11 fold together in accordance with FIGURE 14a, and when in operation, fins 11 extend in accordance with FIGURE 14b.

I claim:
1. A vehicle for transporting small objects from outside the earth's atmosphere to the surface of the earth comprising container means defining an elongated hollow body, radially disposed planar surface members attached to and extending substantially the length of the container and means for rotating the vehicle about its longitudinal axis comprising a raised bead disposed on corresponding sides of each of the planar surface members proximate the outer peripheral edges thereof.

2. A vehicle for transporting small objects from outside the earth's atmosphere to the surface of the earth comprising container means defining an elongated hollow body, radially disposed planar surface members attached to and extending substantially the length of the container and means for rotating the vehicle about its longitudinal axis comprising a surface projecting outwardly from the surface of the planar member on corresponding sides of each of said planar surface members proximate the outer peripheral edges thereof.

References Cited

UNITED STATES PATENTS

| | | | |
|---|---|---|---|
| 3,233,547 | 2/1966 | Fletcher | 244—138.1 X |
| 3,264,985 | 8/1966 | Reed | 102—4 |
| 3,339,673 | 9/1967 | Schafer | 244—138 X |

FOREIGN PATENTS 619,922   5/1961   Canada.

OTHER REFERENCES

B. H. Little, Jr.: Aerodynamic Heating for Lunar Re-Entry Vehicles, printed in vol. 11, Advances in Astronautical Sciences, ed. H. Jacobs, 1963, an AAS publication, pp. 767, 79–793 relied on.

FERGUS S. MIDDLETON, *Primary Examiner.*

U.S. Cl. X.R.

244—3.23